Figure 1:
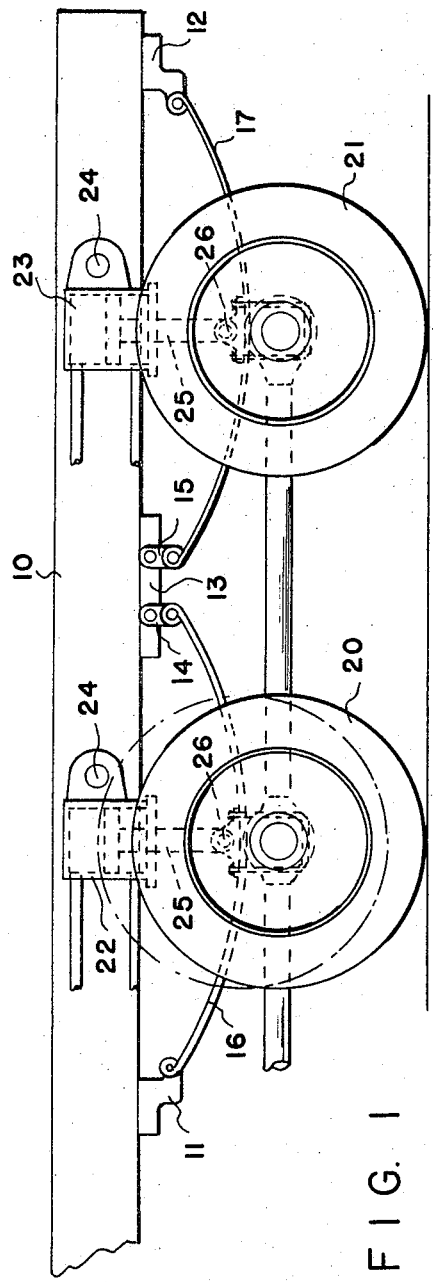

Aug. 8, 1967  C. E. MARGALA  3,334,913
FLEXIBLE SUSPENSION FOR LOAD-BEARING ROAD VEHICLES
Filed May 19, 1965  2 Sheets-Sheet 1

INVENTOR.
CHARLES E. MARGALA
BY
*Francis J. Klempay*
ATTORNEY

Aug. 8, 1967  C. E. MARGALA  3,334,913
FLEXIBLE SUSPENSION FOR LOAD-BEARING ROAD VEHICLES
Filed May 19, 1965  2 Sheets-Sheet 2

INVENTOR.
CHARLES E. MARGALA
BY
*Francis J. Klempay*
ATTORNEY

United States Patent Office 3,334,913
Patented Aug. 8, 1967

3,334,913
FLEXIBLE SUSPENSION FOR LOAD-BEARING ROAD VEHICLES
Charles E. Margala, 2610 Hubbard Road,
Youngstown, Ohio 44505
Filed May 19, 1965, Ser. No. 457,004
5 Claims. (Cl. 280—104.5)

This invention relates to load-bearing road vehicles, and more particularly to an improved system for suspending a plurality of axles therefrom. Multiple tandem axles are commonly used to meet the limits of load concentrations imposed by various state laws, and heretofore the mechanical arrangements used to distribute the load among multiple axles as well as to stabilize the side-to-side loading while yet adequately anchoring the axles against fore and aft movement due to driving or braking thrusts has been quite heavy, complex and costly. The equipment design is further complicated by the desire and need to controllably retract at least one of the axles to temporarily increase the traction of the wheels and tires on the remaining axle or axles when under load and to fully retract one or more of the axles when running empty or under light load to save tire wear and increase controllability of the vehicle.

The primary object of the invention is the provision of an improved construction for a multiple axle suspension system having the general operational characteristics enumerated above which is vastly simplified as compared to systems now proposed, which is much lower in cost, and operative over long periods of service with a minimum of maintenance. The gist of the invention lies in the combination of a combined leaf spring and air spring assembly at each end of each axle, the air spring being, in turn, of a combined hydraulic-air type with a double-acting hydraulic cylinder connected to the axle, all for the purpose of achieving simplicity and operational flexibility as will presently appear. The leaf spring may be built-up of only a few leaves or it may be simply a single leaf provided that its dimensions and characteristics are sufficient to adequately resist any side thrust which may be applied to the axle by the body and load carried thereby, and to resist the driving and/or braking torque and thrust applied from the axle. This leaf spring, however, is neither intended nor sufficient in strength to carry much of the load, this being done by the connected termini of the hydraulic-air system. By utilizing a common source for the air-pressured hydraulic oil used in the system, it will be apparent that the load will be equally distributed as between each axle used in the system and as between each end of each axle. This avoidance of overloading of any road wheel greatly extends the life of the times or dual tires on these wheels. Further, abnormal downward inertial thrusts as occurs when the vehicle bottoms in a dip in the roadway, for example, are effectively cushioned by further compression of the air which is applied against the hydraulic oil.

Since in a system of my invention the terminal ends of the hydraulic-air load-bearing assembly are double-acting cylinders it is possible to readily valve the hydraulic oil so that a selected one or more of the axles can be partially retracted to increase the load and traction of the other axles or to fully retract one or more selected axles to facilitate road running when little or no load. There is thus effected a wide flexibility in the operation of the suspension system which is of substantial utility in the day-to-day operation of large rigs, either tractors or trailers. Moreover, this is accomplished by the use of simple and inexpensive mechanical equipment.

The above and other objects and advantages of the invention will become apparent upon consideration of the following specification and the accompanying drawing wherein there is disclosed a preferred embodiment of the invention.

Figure 2:
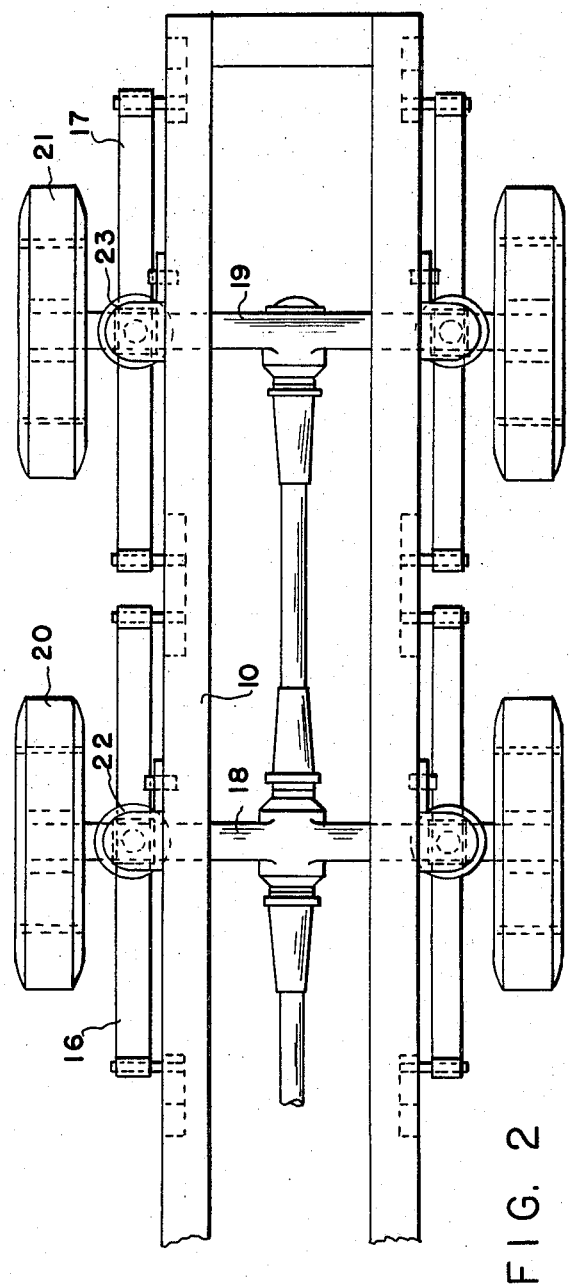
Figure 3:
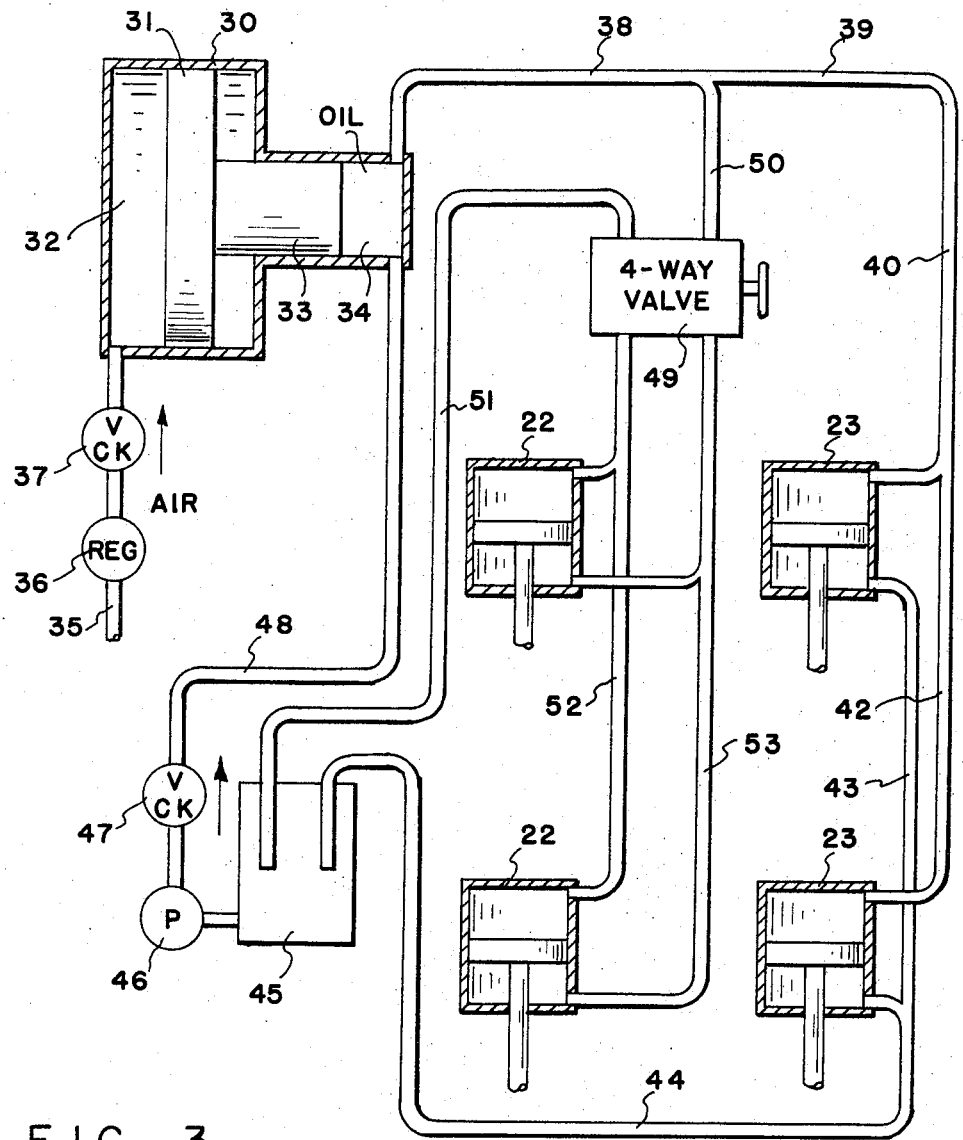

In the drawing:

FIGURES 1 and 2 are a side elevation and a plan view, respectively, of a portion of a load-bearing road vehicle utilizing the principles of the present invention; and FIGURE 3 is a schematic showing of an air-oil system utilized in conjunction with the elements of FIGURES 1 and 2.

Referring now to the drawing, reference numeral 10 designates the frame of a road vehicle which is to be supported by the suspension of the invention. As shown, the frame 10 comprises the usual two parallel side rails and rigidly connected to these side rails at longitudinally spaced points are the brackets 11, 12 and 13. Pivotally connected to the front brackets 11 are the heavy leaf springs 16 which are connected at their rear ends to the bracket 13 by means of the shackles 14. These leaf springs 16 are elliptical, as shown, and perform the usual function of suspending an axle (designated by reference numeral 18) from the frame 10 in a resilient manner, the springs being free to flex upwardly under load as is well understood in the art. In accordance with the principles of this invention, however, the springs 16 are each made of a single leaf or if multiple leaves are used are made much weaker in vertical load-bearing capacity than normally employed. The reason for this will become obvious later. However, these springs are made of adequate width to resist the side thrusts which may be applied to the axle 18 by the load on the frame 10 as is generated, for example, in rounding a sharp curve. Also, the springs 16 have adequate longitudinal strength to resist any tractive or braking thrust which may be encountered at the axle 18.

For suspending the tandem rear axle 19, I provide a pair of elliptical leaf springs 17 which may be identical with the springs 16, and these springs 17 are pivotally connected at their rear ends to the rear brackets 12 while their front ends are connected to the bracket 13 through the shackles 15. In accordance with usual practice, the axles 18 and 19 are fitted with road-engaging wheels 20 and 21, respectively. While I have illustrated the axles 18 and 19 as being of the driving type it should be understood that one or both of these axles may be of the dead type, depending on the character of the vehicle to which the invention is applied.

To carry most of the load of the vehicle while better distributing this weight to the four ends of the axles 18 and 19, and while improving the cushioning effect of the suspension system, I provide the hydraulic cylinders 22 and 23, the first pair 22 being for the axle 18 while the second pair 23 is mounted over the axle 19. These cylinders are double-acting for a purpose to be later described and they are mounted on the frame 10 for limited tilting movement which may be provided by the mounting pins 24. As shown, the piston rods 25 of these cylinders 22 and 23 are pivotally connected at 26 to the axles 18 and 19, the connections being shown as being made through the upper clamp pads for the springs 16 and 17, it being common practice to rigidly connect the center portions of leaf springs to the axles by means of such pads and heavy U-bolts, as suggested in the drawing. The pivotal mounting of the cylinders 22 and 23 and the pivotal interconnection of the lower ends of the piston rods thereof to the axles 18 and 19 permit the springs 16 and 17 to flex upwardly and downwardly—pivoting about the pins carried by brackets 11 and 12.

To provide the cushioning action desired for the suspension system while yet allowing the stiffness thereof to be varied in relation to the load, I provide the air-hydraulic system shown in FIGURE 3 wherein the double-acting cylinders 22 and 23 are schematically shown in connected relation with the essential components of this air-hydraulic system. I first provide a pressure intensifier 30 having a large piston 31 against the outer face of which is stored a volume 32 of air under pressure. Connected with the piston 31 is a ram 33, of lesser diameter than the piston 31, to maintain a preselected pressure on a quantity of hydraulic oil which is stored in the space 34. Air under pressure is supplied to the space 32 from the vehicle's supply of compressed air through conduit 35, pressure regulator 36 and check valve 37.

In accordance with the initially stated objects of the invention, it is possible to integrate with the improved general suspension system of the invention an arrangement whereby one of the tandem axles with its attached road wheels may be retracted vertically with respect to the other tandem axle. Such retraction is useful at times such as when it is desired to increase the loading on a driven axle for increased traction or when it is desired to minimize tire wear when running under a light or no load. Solely for illustration purposes only, I have chosen the front axle 18 as being retractable and, accordingly, the pistons 22 therefore are interconnected into the hydraulic system of FIGURE 3 in a manner different from the pistons 23 of the axle 19. The upper ends of the cylinders 23 are simultaneously connected to the storage space 34 by means of the conduits 38, 39, 40 and 42. The bottom ends of these cylinders 23 are interconnected by conduit 43 leading to conduit 44 which discharges into a reservoir 45. Thus, all pressure is removed from the lower ends of cylinders 23 and the pistons therein are accordingly free to move up and down in balance between the downward forces exerted by the pressure on the tops of the pistons and the upward forces exerted through the piston rods by the reaction of the vehicle load.

Considering now the action of the complete suspension system thus far described, it will be obvious that during the running of the vehicle the load-bearing reaction at opposite ends of the axle 19 will be equalized whatever the road conditions and the tilt of the axle, the relatively weak spring 17 having little or no effect on this compensation. Shock loads transmitted upwardly through the wheels on the axle 19 will, of course, cause the pistons in cylinders 23 to rise, building up pressure and increased volume in the space 34. This increase in oil pressure forces the ram 33 to the left, as viewed in FIGURE 3, and further compresses the air in space 32 whereby the shock of the impact is effectively cushioned and dissipated by the quantity of air in space 32. After dissipation of the shock or impact, the expansion of the air in space 32 will restore the ram 32 and the pistons in cylinders 23 to their normal operating positions. Of course, the regulator 36 is so set in relation to the load to be carried that under normal operating conditions the pistons in cylinders 23 are at or adjacent to the bottoms of their strokes. While the springs 17 are relatively weak, they are nevertheless sufficient to hold these pistons off the bottoms of the cylinders which may be a desired characteristic. In any event, the ability to tailor the stiffness of the suspension to the load is highly desirable for running smoothness and safety, firmer footing, and decreased tire wear.

Any oil coming into the reservoir 45 is forced by pump 46 through a check valve 47 and a conduit 48 back to the space 34 at the head end of plunger 33. So long as the pump 46 has a greater pressure capacity than any oil pressure which may be generated from the compressed air through the setting of regulator 36, no further control instrumentalities are required in this pump circuit. The arrangement, however, permits of the locking of the oil in space 34 so that shock loads are buffered by further compression of the air in space 32, as above explained. The arrangement also does not impede the regulation of the load-bearing capacity or stiffness of the suspension by adjustment of the valve 36.

To provide for the vertical retraction of the front axle 18 and of the road wheels carried thereby, as indicated in dashed lines in FIGURE 1, an additional control is provided in the oil circuits leading to the cylinders 22 which are connected to this axle. Thus, I provide a four-way valve 49 which is normally manually controlled and which in one position will connect the upper ends of the cylinders 22 to the oil supply 34 through conduits 50 and 52. In this position of the valve 49, the lower ends of the cylinders 22 will discharge into reservoir 45 through conduits 53 and 51. At this time it will be observed that the cylinders 22 will have precisely the same action as the cylinders 23, distributing the load equally to opposite ends of the axle 18 and being susceptible of precise control as to stiffness of the suspension for this axle. It should be further observed, however, that the upper load bearing ends of both cylinders 22 and 23 are commonly connected through conduit 38 to the space 34 so that the load is also equally divided between the front rear axles 18 and 19.

When it is desired to retract the axle 19 to place more weight on the wheels 21 or to lift the wheels 20 off the roadway, the operator can actuate the valve 49 to the other of its operating positions whereby the oil pressure line 50 is connected to the conduit 53 to apply oil pressure to the bottom ends of the cylinders 22. At this time, the upper ends of the cylinders 22 are connected through conduit 52, valve 49 and conduit 51 back to the reservoir 45. The upward forces thus generated by the cylinders 22 are greater than the strength of the springs 16, allowing these springs to flex upwardly thereby lifting the axle 18 vertically upward.

It should now be apparent that I have provided an improved flexible suspension for load-bearing road vehicles which accomplishes the objects initially set out above. While the more comprehensive aspect of the invention is particularly useful on vehicles with multiple axles, certain novel features of the invention may be advantageously used on but a single axle. Thus, the use of an air-cushioning intensifier to supply load-bearing oil pressure to the cylinders connected to the axle together with means to bleed the pressure from the lower ends of the cylinders is in itself a beneficial combination particularly when it is considered that the loading is better distributed and that adjustment may be readily made to the stiffness of the suspension. When multiple axles are involved, additional advantages are obtained, as outlined above. Further, and as pointed out above, the invention is equally applicable to driven and dead axles, whether on trailers, tractors or integral units, and regardless of the number of axles involved.

The use of high-pressure oil as a load-bearing medium at the axles is advantageous since the parts can be made smaller and lighter. Further, by associating these oil-pressure devices with the mechanical leaf springs, a simplified and inexpensive over-all construction is made possible while yet providing a rig of heavy load-bearing capacity.

It should be appreciated that the accompanying illustration is schematic only, no attempt being made toward detailed engineering. For example, the mounting of and pivotal action of the cylinders 22, 23 would most likely be accomplished by expedients other than those shown and, in fact, the cylinders themselves may be replaced by other suitably-acting fluid pressure devices. Reference should accordingly be had to the appended claims in determining the scope of the invention.

What I claim is:

1. In a load-bearing road vehicle having a transverse axle mounting a road-engaging wheel at either end and having a frame, a pair of transversely spaced elliptical leaf springs interposed between said frame and the opposite ends of said axle for carrying only a part of the load on said frame while yet providing lateral stability between said frame and axle and a connection between said frame and axle to transmit any tractive and braking thrusts which may be encountered, a hydraulic-powered force-exerting device on either side of said frame and connected to the ends of said axle, an expansible chamber to supply hydraulic fluid under pressure to said devices, at least one wall of said expansible chamber being movable, means to move said wall and to apply mechanical pressure therethrough comprising a second expansible chamber, and means to maintain a predetermined quantity of air under a preselected pressure in said second chamber, the arrangement being such that shock loads transmitted upwardly through said axle are cushioned by further compression of the air in said second chamber.

2. Apparatus according to claim 1 further characterized in that said devices are each of the double-acting type having an upper chamber connected to said first mentioned chamber, and further including a liquid reservoir together with means for connecting the bottom chambers of said devices with said reservoir, and a pump and a check valve in series connecting said reservoir with said first mentioned chamber.

3. In a load-bearing road vehicle having a frame and tandem axles each mounting road-engaging wheels at either end for supporting said frame, a liquid pressure actuated device at each end of one of the axles and interposed between the axle and frame whereby some of the load on the frame is imposed on the said one of said axles, double-acting liquid pressure actuated devices interposed between said frame and the ends of the other of said axles, a source of hydraulic fluid under pressure connected to the first mentioned devices, and a manual valve interconnecting said source alternately with opposite ends of said double-acting devices, the arrangement being such that these said other of said axles may be raised under power with respect to the said one of said axles.

4. Apparatus according to claim 3 further characterized in that said source comprises an expansible chamber having at least one movable wall, means to apply mechanical force to said wall in a direction tending to maintain the pressure in said chamber comprising a second expansible chamber, and means to maintain a predetermined quantity of air under preselected pressure in said second expansible chamber.

5. Apparatus according to claim 4 further including a fluid reservoir and further characterized in that said manual valve is of the four-way type wherein while fluid from said source is directed into one of each of the two chambers of each of said double-acting devices the fluid in the other of the chambers of said double-acting devices is directed into said reservoir, and means comprising a pump and a check valve in series for directing fluid from said reservoir into said first mentioned expansible chamber.

References Cited
UNITED STATES PATENTS 2,926,023 2/1960 Kraus.
3,002,765 10/1961 MacDuff.

FOREIGN PATENTS 401,549 9/1909 France.
936,001 9/1963 Great Britain.

BENJAMIN HERSH, *Primary Examiner.*

P. GOODMAN, *Assistant Examiner.*